United States Patent Office 3,266,889
Patented August 16, 1966

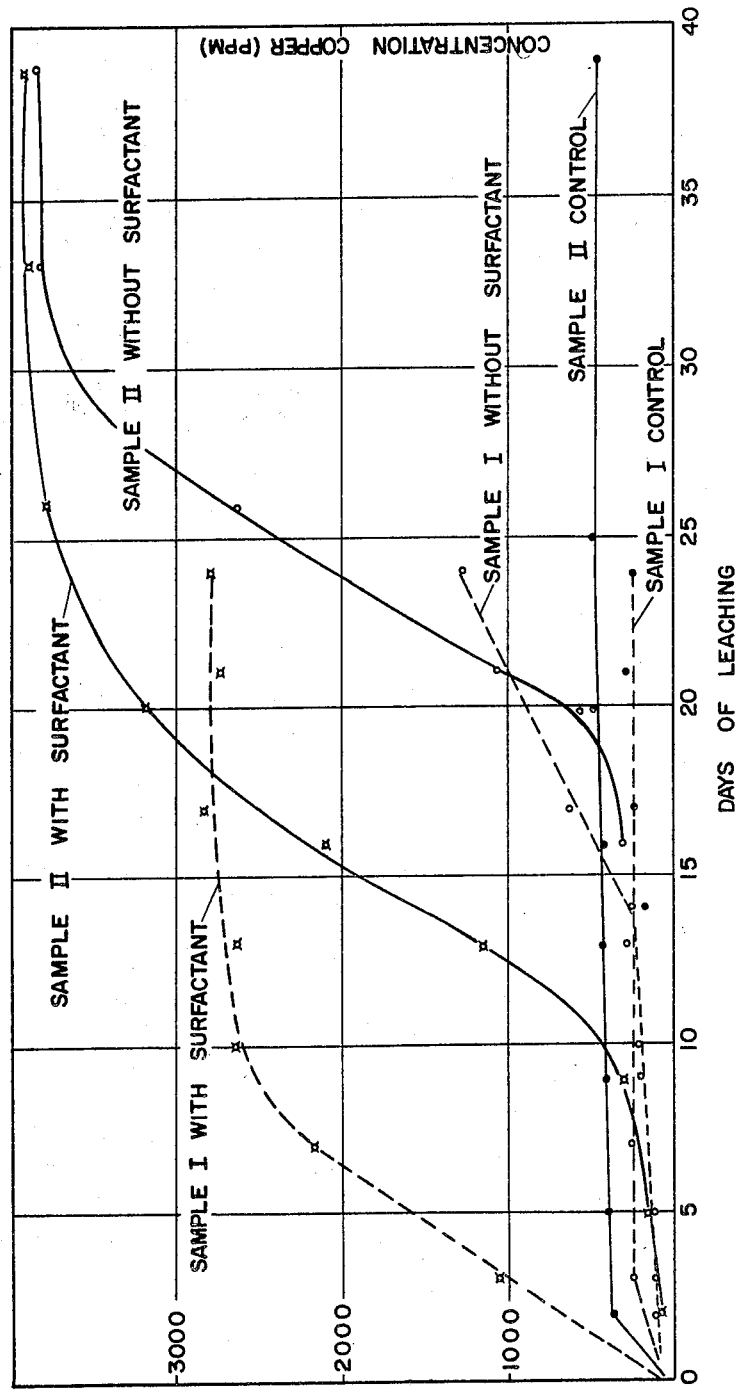

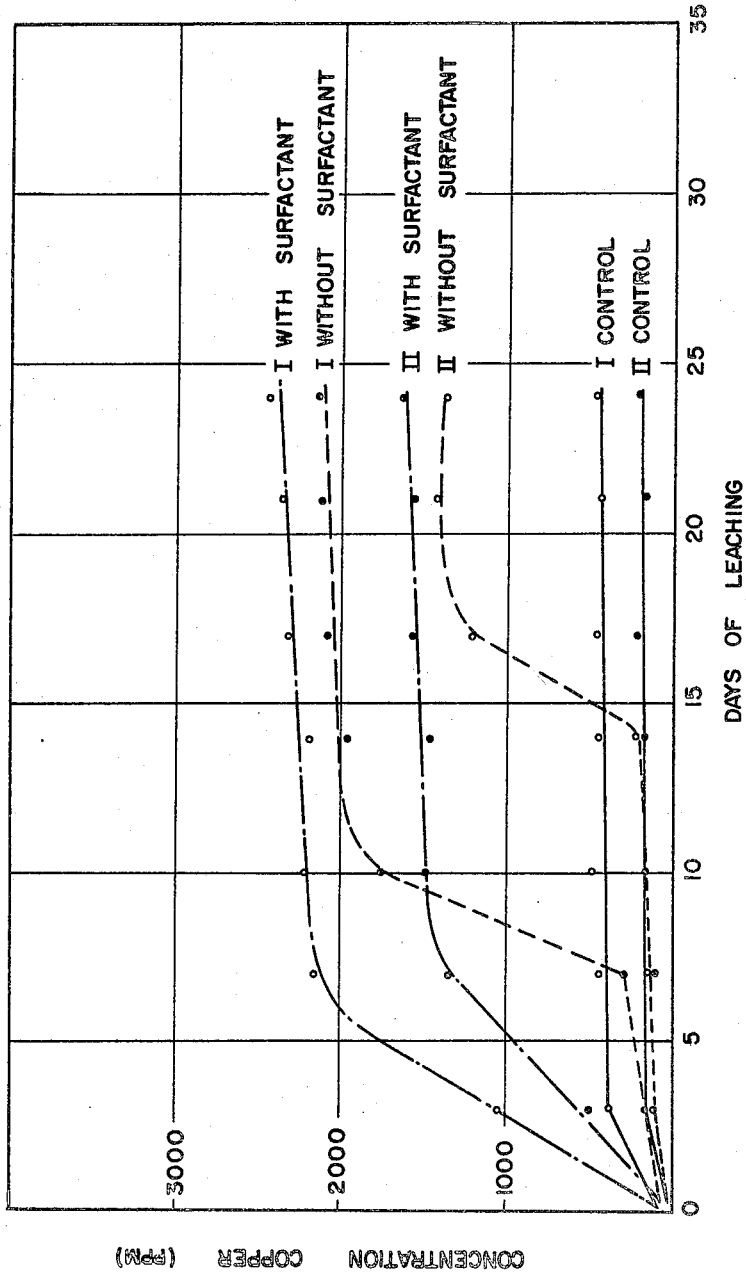

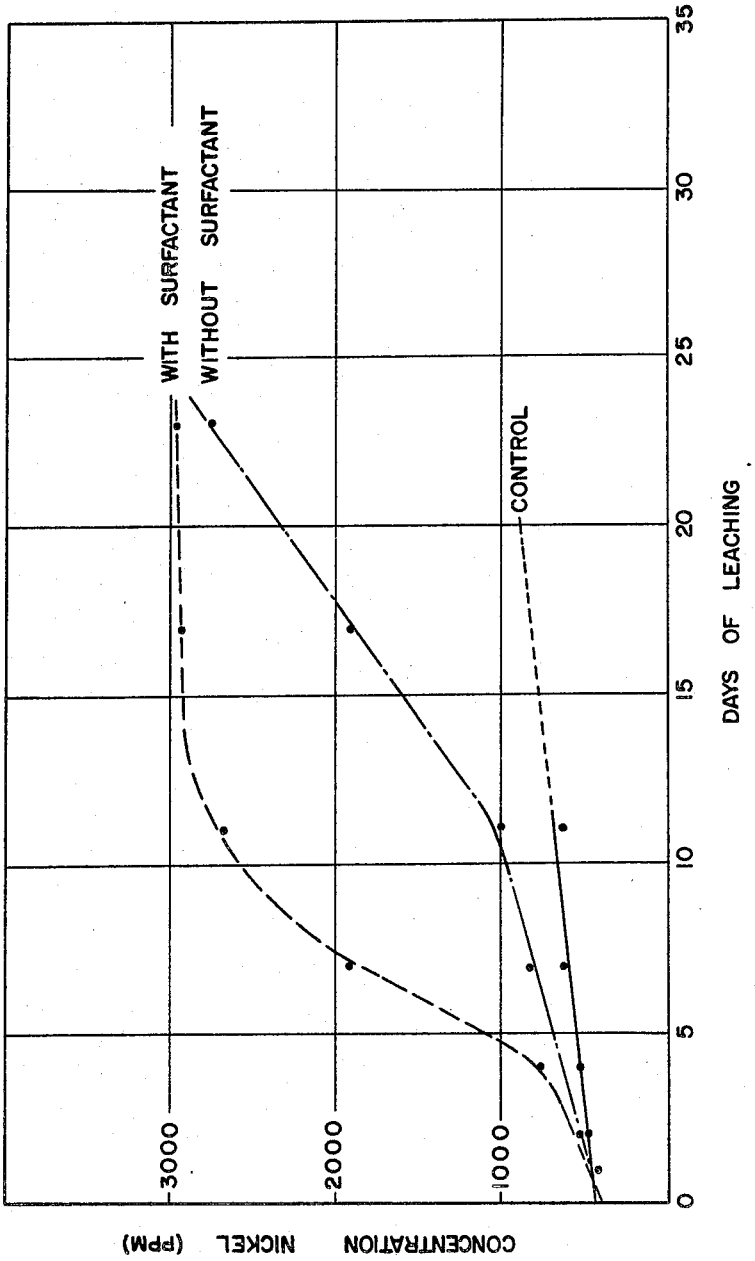

3,266,889
METHOD OF EXTRACTING METALS FROM SULFIDE ORES USING BACTERIA AND AN ACCELERATING AGENT
Douglas W. Duncan and Carol J. Teather, Vancouver, British Columbia, Canada, assignors to British Columbia Research Council, Vancouver, British Columbia, Canada
Filed Apr. 7, 1964, Ser. No. 357,997
8 Claims. (Cl. 75—101)

This invention relates to methods of extracting metals in soluble state from naturally-occurring sulfide ores.

An object of the present invention is the provision of improvements in the microbiological leaching of metallic sulfides from ores.

Another object is the provision of a method which greatly reduces the time involved in the microbiological extraction of ores.

A further object is the provision of a method of increasing the extent of microbiological extraction of ores.

Yet another object is the improvement of microbiological leaching of metallic sulfides without materially altering the known method, without materially increasing the cost of the operation, and if desired without removing the ores from the ground.

Certain bacteria, most commonly referred to as *Thiobacillus ferrooxidans*, have the ability to oxidize the sulfide and ferrous iron in ores containing sulfide minerals. Oxidation of the sulfide and ferrous iron, or sulfide only, to sulfate and ferric iron releases a variety of metals from the mineral crystal lattice. These include iron, copper, nickel, zinc, molybdenum, arsenic, and other possibilities include gold, silver, cobalt, cadmium and the rare earth metals as listed in the periodic table. Although these metals are released from the mineral lattice, they may not necessarily be in the soluble form. For example, in iron-containing sulfide ores large quantities of ferric iron may be precipitated as the hydroxide. The sulfuric acid generated from the sulfate may also leach oxides of certain metals, such as copper, uranium and aluminum.

The natural process has been used commercially as a means of recovering metals, particularly copper from copper-bearing ores. Usually the commercial application involves low-grade ores which are not economical to process by more conventional methods.

The natural process is not restricted to one geographical area. Evidence of sulfide oxidation and concomitant leaching of metals has been observed in Arizona, California, Utah, Virginia in the United States; British Columbia in Canada; Russia; Spain, Belgian Congo; Peru; and Mexico. In all these cases bacteria have been involved.

Although the oxidation process that occurs in nature is slow and incomplete in extracting metal from ore, it represents a considerable economic advantage for those mining organizations on whose property microbiological leaching occurs. For example, microbiological leaching of natural copper ore bodies, by drainage waters, produces an acidic solution which may contain upward of 1% metallic copper. The copper is recovered from solution simply by displacement by scrap iron. Overall recovery costs have been estimated at approximately 40% of conventional mining and milling costs. Thus, when some mining operations become uneconomic by conventional methods, the recovery of copper from acidic mine drainage water may be continued.

Despite its present commercial importance, the microbiological release of copper and other metals from their sulfides is relatively slow and incomplete. Using percolators and microorganisms, Bryner et al. (1954) released only 2.8% of the copper from one chalcopyrite ore sample in 70 days and 6.8% from another sample in 56 days. Also using percolators, Malouf and Prater (1961) leached 50% of the copper present in another sample of chalcopyrite in about 170 days and a total of 60% in 470 days. Razzell (1962) released 25% of the copper from a chalcopyrite sample in 60 days with percolators and 35% in 100 days in stationary flint-glass bottles. Razzell and Trussell (1963) improved this yield to 40% of the copper in 60 days. These excessively long leach periods and usually poor yields limit the economic significance of microbiological leaching. Thus any means of accelerating the leaching process is of real economic advantage.

This invention concerns a means of improving the bacterial leaching process so that when bacteria are placed in close proximity with sulfide minerals or sulfide ore samples, leaching starts more rapidly, continues at a higher rate, and increases the extraction of metal from the ore. The invention more specifically relates to the use of a group of chemicals, known as surface-active agents or surfactants, for accelerating bacterial leaching and for increasing the yield of metal in solution.

Although surfactants include any chemical group of a molecule which preferentially collects at a surface or interface, affecting surface properties such as surface tension or the wetting angle of liquids on solids, they are normally classified into three groups, based on their chemical structure. In virtually all cases the surface-active portion of any molecule is an organic radical. In cationic surfactants the surface-active portion is the cation released by ionization in the liquid carrier; in anionic surfactants, the anion. Non-ionic detergents, as their name implies, do not ionize and the surface-active portion may be in a part of, or distributed throughout an un-ionized molecule. A wide variety of surfactants are available, both theoretically and commercially, displaying a wide range of surface activity under differing conditions.

The surfactants which have been examined show a wide range of properties in the improvement of the microbiological leaching of ores. Some surfactants have been found to reduce the rate and amount of extraction of metal from ore using microbes, others have had no effect, and others have greatly accelerated the rate of microbiological leaching and increased the amount of metal extracted from the ore.

The following are examples of surfactants that improve microbiological leaching of metallic sulfides, namely, polyoxyethylene sorbitan monolaurate, polyoxyethylene sorbitan monopalmitate, polyexyethylene sorbitan monostearate, polyoxyethylene sorbitan monooleate, phenylisooctyl polyethoxy ethanol, nonyl phenoxy polyethoxy ethanol, methyldodecylbenzyl trimethyl ammonium chloride and bis (trimethyl ammonium chloride) methyldodecyl xylene, sodium octyl sulfonate, amino-fatty acid derivative, and imidazoline cationic quaternary. Methyldodecylbenzyl trimethyl ammonium chloride and bis (trimethyl ammonium chloride) methyldodecyl xylene and imidazoline cationic quaternary are cationic surfactants; sodium octyl sulfonate is anionic; and polyoxyethylene sorbitan monolaurate, phenyl iso-octyl polyethoxy ethanol and nonyl phenoxy polyethoxy ethanol are non-ionic.

In the accompanying drawings,

FIGURE 1 is a graph illustrating the effect of surfactant on the extraction of two samples of chalcopyrite, FIGURE 2 is a graph illustrating the effect of surfactant on the extraction of two types of ore, and FIGURE 3 is a graph illustrating the effect of surfactant on the extraction of millerite.

Demonstration of the effectiveness of surfactants in the bacterial leaching of mineral and ore sulfides is provided by the following experimental evidence. If a sample of chalcopyrite ($CuFeS_2$) is finely ground to pass a 325 mesh sieve, and added to a 250 ml. Erlenmeyer flask in the amount of 1 gram of ground ore to 75 ml. of a liquid medium containing 3.0 g. of ammonium sulfate, 0.1 of potassium chloride, 0.5 g. of dipotassium hydrogen phosphate, 0.5 g. of magnesium sulfate, heptahydrate and 0.01 g. of calcium nitrate per liter of water, adjusted to pH 2.5, inoculated with 3 drops of a 100 times concentrate of an 8 to 10-day old culture of *Thiobacillus ferrooxidans* and the flask placed on a gyratory shaker at 35° C., copper will be released after a period of days. Typical examples are shown in FIGURE 1 where the yields of copper with time of leaching are plotted for two different samples of chalcopyrite mineral each with bacteria and surfactant, with bacteria only and with surfactant but no bacteria. With both mineral samples addition of the surfactant had reduced the time required for the maximum release of copper and with sample I the net yield is greater with surfactant than without. Although in some cases the surfactant may not increase the ultimate level of copper release from the mineral the lag period is materially reduced.

In FIGURE 2 is illustrated the advantage gained by the use of the above surfactant in accelerating the leaching of two ore samples, one predominantly a chalcopyrite ore (I), the other an arsenopyrite-chalcopyrite ore (II).

FIGURE 3 illustrates the advantage gained by the use of the same surfactant in accelerating the release of nickel from a sample of millerite (nickel sulfide).

It is believed that the surfactant acts by assisting contact of the bacterial cells with a surface of the mineral particles and, therefore, it is believed that the desired effects are not limited to copper and nickel sulfides.

Under conditions where the ratio of weight of mineral to volume of liquid is constant, the surfactant shows a maximum positive effect at a specific concentration. This is demonstrated in the following table where the optimum concentrations of polyoxyethylene sorbitan monolaurate (I), polyoxyethylene sorbitan monopalmitate (II) and polyoxyethylene sorbitan monostearate (III), for the leaching of copper from chalcopyrite are in all cases 0.003%. On the other hand, concentrations of these surfactants of 0.5% or higher suppress yields of copper from chalcopyrite.

PERCENTAGE EXTRACTION OF COPPER FROM CHALCOPYRITE

| Inoculum | Surfactant conc., percent by volume | Surfactant | | |
|---|---|---|---|---|
| | | None | I | II | III |
| No bacteria | 0 | 21.0 | | | |
| Bacteria | 0 | 8.3 | | | |
| Do | 0.0001 | | 57.2 | 22.2 | 28.9 |
| Do | 0.003 | | 74.4 | 44.5 | 58.8 |
| Do | 0.05 | | 31.8 | 27.3 | 19.5 |
| Do | 0.1 | | 23.9 | 19.9 | 15.1 |
| Do | 0.5 | | 21.0 | 11.9 | 11.4 |
| Do | 1.0 | | 12.1 | 15.9 | 18.6 |

Different surfactants differ in their effectiveness for increasing the rate and the amount of metals extracted from their corresponding sulfides by microbes. Furthermore, the response of surfactants on the microbiological leaching process is not the same for all sulfide ores. With some ores, surfactants greatly increase the rate and extent of microbiological extraction of metals; in other ores, unknown factors make these same surfactants of no value. A comparison of surfactants acting in two ores in the presence of the sulfide-oxidizing bacterium, *Thiobacillus ferrooxidans*, is shown in the following table:

PERCENTAGE COPPER RELEASED BY MICROBIOLOGICAL EXTRACTION OF ORES IN THE PRESENCE OF DIFFERENT SURFACTANTS

| Surfactant | Concn. in extrn. liquid (percent by volume) | Ore No. I | Ore No. II |
|---|---|---|---|
| Polyoxyethylene sorbitan monolaurate | 0.003 | 72.1 | 38.2 |
| Nonyl phenoxy polyethoxy ethanol I | 0.001 | 67.8 | 41.8 |
| Phenylisooctyl polyethoxy ethanol | 0.001 | 66.5 | 43.3 |
| Nonyl phenoxy polyethoxy ethanol II | 0.001 | 64.4 | 41.6 |
| Methyldodecylbenzyl trimethyl ammonium chloride and bis (trimethyl ammonium chloride) methyldodecyl xylene | 0.001 | 6.26 | 36.9 |
| Sodium octyl sulfonate | 0.001 | 55.8 | 38.3 |
| Imidazoline cationic quaternary | 0.001 | 53.6 | 36.2 |
| Amino-fatty acid derivative | 0.003 | 52.7 | 37.5 |
| Saturated hydrocarbon sulfonate | 0.003 | 47.9 | 37.2 |
| Sodium alkyl benzene sulfonate | 0.003 | 49.0 | 40.6 |
| No surfactant | | 48.6 | 37.6 |
| No surfactant, no bacteria | | 13.2 | 4.2 |

Nonyl phenoxy polyethoxy ethanol I and II differ by the number of ethoxy groups they contain.

It will be seen in this table that some of the surfactants increase the yield of soluble copper from ore by almost 50%, whereas other surfactants do not increase the yield of soluble copper from the same ore. In this illustration, with Ore I, those surfactants which do increase the yield of copper represent all three types of surface active compounds, that is, cationic, anionic and non-ionic detergents. In other cases, illustrated Ore by II, none of the surfactants improved the yield of soluble copper. This illustrates that a compatibility must exist between the surfactant, the microbes and the ore for the surfactant to demonstrate its favorable effect.

In the treatment of naturally-occurring bodies of ores, extraction of metals in the soluble form by microbiological action is customarily carried out by cascading the extracting medium either over or through the ore body. This invention may be carried out very easily by adding the surfactants to the extracting medium in order to improve the rate and extent of extraction of metals under these conditions.

The economic advantages of this invention lie in increasing both the rate and extent of microbiological extraction of ores. Another economic advantage is that more concentrated extracts of metals are obtainable by the use of surfactants, and this permits more complete recovery of metals than is obtained from dilute extracts.

What we claim as our invention is:

1. The method of extracting metals in a soluble state from naturally-occurring sulfide ores, which comprises exposing sulfide ore to an aqueous leaching medium for metallic sulfides containing sulfide-oxidizing bacteria and a sub-inhibitory concentration of a surfactant which accelerates bacterial leaching.

2. The method of extracting metals in a soluble state from naturally-occurring sulfide ores, which comprises exposing sulfide ore to an aqueous leaching medium for metallic sulfides containing sulfide-oxidizing bacteria and a surfactant which accelerates bacterial leaching, said surfactant being from about 0.0001% to about 0.05% by volume of the aqueous solution.

3. The method of extracting metals in a soluble state from naturally-occurring sulfide ores, which consists of exposing sulfide ore to an aqueous leaching medium for metallic sulfides containing sulphide-oxidizing bacteria and a sub-inhibitory concentration of a surfactant selected from the group consisting of polyoxyethylene sorbitan monolaurate, polyoxyethylene sorbitan monopalmitate, polyoxyethylene sorbitan monostearate, polyoxyethylene sorbitan monooleate, imidazoline cationic quaternary, phenylisooctyl polyethoxy ethanol, nonyl phenoxy polyethoxy ethanol, methyldodecylbenzyl trimethyl ammonium chloride and bis (trimethyl ammonium chloride) methyldodecyl xylene, sodium octyl sulfonate, and amino-fatty acid derivative.

4. The method of extracting metals in a soluble state from naturally-occurring sulfide ores, which consists of exposing sulfide ore to an aqueous leaching medium for metallic sulfides containing sulphide-oxidizing bacteria and a surfactant selected from the group consisting of polyoxyethylene sorbitan monolaurate, polyoxyethylene sorbitan monopalmitate, polyoxyethylene sorbitan monostearate, polyoxyethylene sorbitan monooleate, imidazoline cationic quaternary, phenylisooctyl polyethoxy ethanol, nonyl phenoxy polyethoxy ethanol, methyldodecylbenzyl trimethyl ammonium chloride and bis (trimethyl ammonium chloride) methyldodecyl xylene, sodium octyl sulfonate, and amino-fatty acid derivative, said surfactant being from about 0.0001% to about 0.05% by volume of the aqueous solution.

5. A leaching medium for metallic sulfide ores, comprising an aqueous solution containing sulfide-oxidizing bacteria and a sub-inhibitory concentration of a surfactant which accelerates bacterial leaching.

6. A leaching medium for metallic sulfide ores, comprising an aqueous solution containing sulfide-oxidizing bacteria and a surfactant which accelerates bacterial leaching, said surfactant being from about 0.0001% to about 0.05% by volume of the aqueous solution.

7. A leaching medium for metallic sulfide ores, comprising an aqueous solution containing sulfide oxidizing bacterial and a sub-inhibitory concentration of a surfactant selected from the group consisting of polyoxyethylene sorbitan monolaurate, polyoxyethylene sorbitan monopalmitate, polyoxyethylene sorbitan monostearate, polyoxyethylene sorbitan monooleate, imidazoline cationic quaternary, phenylisooctyl polyethoxy ethanol, nonyl phenoxy polyethoxy ethanol, methyldodecylbenzyl trimethyl ammonium chloride and bis (trimethyl ammonium chloride), methyldodecyl xylene, sodium octyl sulfonate, and amino-fatty acid derivative.

8. A leaching medium for metallic sulfide ores, comprising an aqueous solution containing sulfide-oxidizing bacterial and a surfactant selected from the group consisting of polyoxyethylene sorbitan monolaurate, polyoxyethylene sorbitan monopalmitate, polyoxyethylene sorbitan monostearate, polyoxyethylene sorbitan monooleate, imidazoline cationic quaternary, phenylisooctyl polyethoxy ethanol, nonyl phenoxy polyethoxy ethanol, methyldodecylbenzyl trimethyl ammonium chloride and bis (trimethyl ammonium chloride) methyldodecyl xylene, sodium octyl sulfonate, and amino-fatty acid derivative, said surfactant being from about 0.0001% to about 0.05% by volume of the aqueous solution.

References Cited by the Examiner

UNITED STATES PATENTS 2,829,964  4/1958  Zimmerley et al.
3,218,252  11/1965  Glover et al.

DAVID L. RECK, *Primary Examiner.*

N. F. MARKVA, *Assistant Examiner.*